(12) United States Patent
Andersson et al.

(10) Patent No.: US 6,377,905 B1
(45) Date of Patent: Apr. 23, 2002

(54) METHOD AND ARRANGEMENT FOR MONITORING OBJECTS

(75) Inventors: Bengt Andersson, Kullavik; Sten Ahlbom, Västra Frölunda, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/414,971

(22) Filed: Oct. 12, 1999

(30) Foreign Application Priority Data

Oct. 13, 1998 (SE) .............................. 9803487

(51) Int. Cl.$^7$ ................................ G01C 9/00
(52) U.S. Cl. .................... 702/150; 356/3.09; 356/4.01; 356/4.07
(58) Field of Search .......................... 702/95, 150–155, 702/158–159, 176, 142; 250/201.2; 356/630, 47, 615, 622, 3.09, 4.01; 342/433, 437, 465

(56) References Cited

U.S. PATENT DOCUMENTS

| | | | |
|---|---|---|---|
| 4,209,252 A | * 6/1980 | Arditty et al. | 356/4.07 |
| 4,395,123 A | * 7/1983 | Minott | 356/510 |
| 4,651,283 A | * 3/1987 | Sciaky et al. | 700/207 |
| 4,766,323 A | * 8/1988 | Franklin et al. | 250/559.31 |
| 4,911,548 A | * 3/1990 | Keren-Gill | 356/3.09 |
| 5,243,397 A | 9/1993 | Friedland | 356/3.05 |
| 5,283,396 A | 2/1994 | Donner et al. | 178/18.02 |
| 5,890,789 A | * 4/1999 | Inagaki et al. | 359/305 |
| 6,008,798 A | * 12/1999 | Mato, Jr. et al. | 345/168 |
| 6,115,114 A | * 9/2000 | Berg et al. | 356/5.13 |

FOREIGN PATENT DOCUMENTS

WO    WO93/23764    11/1993

* cited by examiner

Primary Examiner—Marc S. Hoff
Assistant Examiner—Khoi Duong
(74) Attorney, Agent, or Firm—Burns, Doane, Swecker & Mathis, L.L.P.

(57) ABSTRACT

The present invention relates to methods and to arrangements for monitoring an object which emits a rotating or oscillating beam whose angular velocity is unknown. The time points at which the beam passes a predetermined number of measuring positions are determined. An angular velocity start value is generated and a predetermined number of object position determinations (at least two independent determinations) are made on the basis of the determined time points, the measuring positions and the start value. It is determined whether or not the position determinations can be considered to be sufficiently in agreement with one another. When agreement is considered sufficient, the start value is accepted as an approximate value, this value approximating the angular velocity of the beam with an acceptable degree of accuracy. If the position determinations are not found to be sufficiently in agreement, the start value is modified and new position determinations are made. This procedure is repeated as often as is required for the position determinations to become sufficiently in agreement with one another, wherewith the start value is accepted as a approximate value of the angular velocity. Subsequent to having obtained the approximate value of the angular velocity, a final position determination of the object can be made.

17 Claims, 5 Drawing Sheets

METHOD AND ARRANGEMENT FOR MONITORING OBJECTS

BACKGROUND

The present invention relates to the field of methods and arrangements that pertain to the monitoring of an object that is designed to emit a rotating or an oscillating beam; and relates more particularly to that part of this field in which the angular velocity of the beam is unknown.

It is sometimes desirable in a number of technical aspects to monitor an object that emits a rotating beam, by observing the movement of said beam. The object to be monitored may be a truck, a ship, an aircraft or part of a machine tool. The rotating beam is normally of an electromagnetic nature, for instance a narrow light cone, a laser beam or a narrow radar lobe emitted from a radar antenna.

WO, A1, 93/23764 describes a system for determining the position of an object. The object includes means for emitting a rotating laser beam. A number of sensors are placed at predetermined measuring positions around the object. Passage of the laser beam past the measuring positions is registered with the aid of the sensors. With knowledge of when the laser beam passes three of the measuring positions, the position of the object can be determined by means of a trigonometrical process.

One drawback with this system is that it is necessary to know the angular velocity of the rotating laser beam in order to determine the position of the object. The angular velocity of the beam is, however, not always known. For instance, the angular velocity may deviate from a standard angular velocity as a result of imperfections in the components that generate the beam, or the object may simply emit a rotating beam whose angular velocity is completely unknown.

SUMMARY

The present invention is concerned with the monitoring of an object which is designed to emit a rotating or oscillating beam and whose angular velocity is unknown. In this respect, a main problem addressed by the invention is one of determining the angular velocity of the beam.

In brief, the problem is solved by iteratively producing on the basis of beam registration values that correspond to the unknown angular velocity to a successively increasing degree.

A primary object of the invention is to determine the angular velocity of the beam so that one may thereafter generate a final determination of the position of the object with a predetermined degree of accuracy. The invention provides both methods and arrangements to this end.

More specifically, the aforesaid problem is solved in the following manner. Those time points at which the beam passes a predetermined number of measuring positions are determined. An angular velocity start value is generated and a predetermined number (at least two) of object position determinations are made on the basis of the determined time points, the measuring positions and the start value. It is also determined whether or not the position determinations can be considered in sufficient agreement with one another, and if such agreement is found to exist the start value is accepted as an approximate value which approximates the angular velocity of the beam with acceptable accuracy. If the position determinations are not sufficiently in agreement, the start value is modified and new position determinations are made. This procedure is repeated for as many times as are necessary for the position determinations to be sufficiently in agreement, wherewith the start value is accepted as the approximate value of the angular velocity.

One main advantage afforded by the invention is that the position of the object can be determined without needing to know the angular velocity of the beam. A further advantage is that the invention does not only permit an object which emits rotating beams to be monitored, but also objects that emit "scanning" beams that perform an oscillatory reciprocating movement—roughly similar to a car windscreen wiper.

The invention will now be described in more detail with reference to preferred embodiments thereof and also with reference to the accompanying drawings.

DETAILED DESCRIPTION

Figure 1:
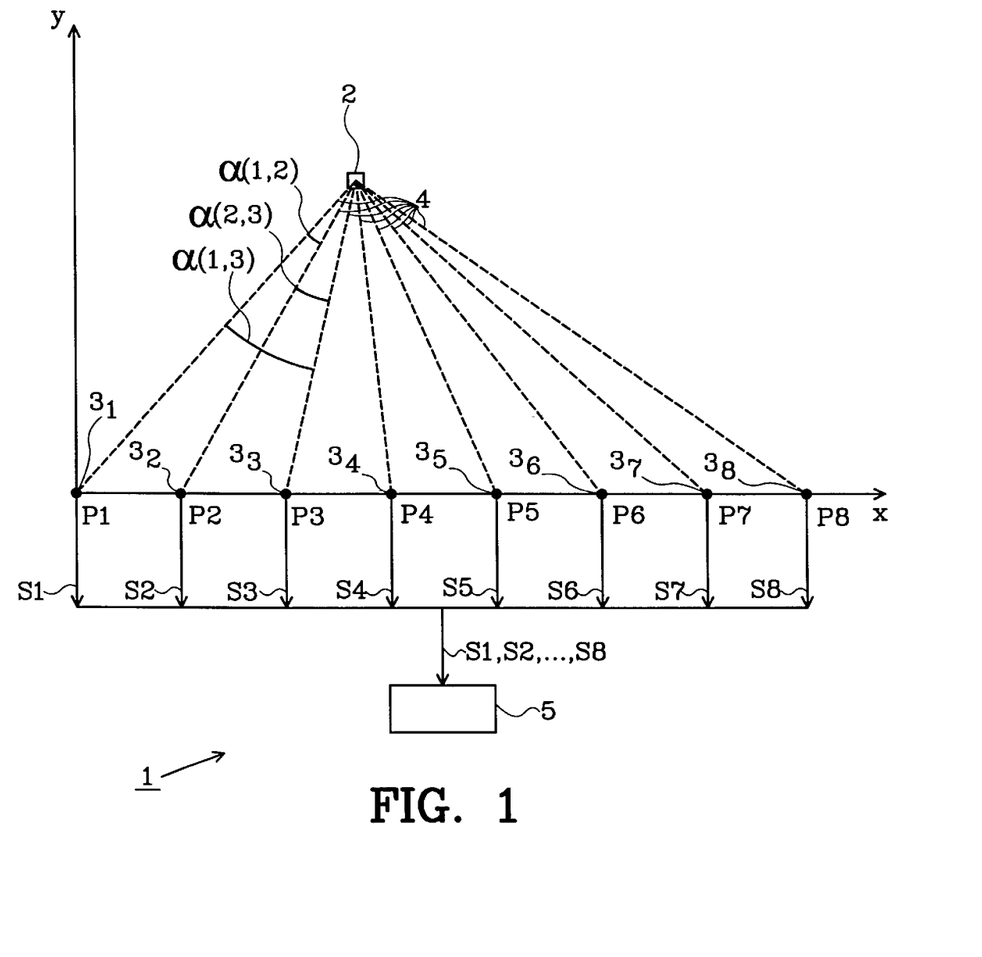
FIG. 1 illustrates by way of example an arrangement for monitoring in accordance with the invention an object which emits a rotating beam.

FIG. 1 illustrates by way of example an inventive arrangement 1 for monitoring an object 2 which emits a rotating beam 4. In the case of the FIG. 1 embodiment, the beam 4 is a narrow radar lobe sent from a rotating radar antenna (not shown) arranged at the object 2. It will be understood, however, that the beam 2 may be of some other kind, for instance a laser beam, a narrow light cone or the like. FIG. 1 shows the beam 4 at a number of time points $t1, t2, \ldots, t8$ at which the beam passes a number of predetermined measuring positions $P1, P2, \ldots, P8$. In the case of the example illustrated in FIG. 1, the measuring positions lie essentially in line along the x-axis shown in the Figure, although it will be understood that the invention is not restricted to precisely this placement of the measuring positions $P1, P2, \ldots, P8$. Also drawn in FIG. 1 is a y-axis, and the object 2 and the beam 4 lie generally in an yx-plane formed by the x-axis and the y-axis.

The arrangement 1 includes means for determining the time points $t1, t2, \ldots, t8$. Thus, the arrangement 1 includes a number of sensors $3_1, 3_2, \ldots, 3_8$ disposed at measuring positions $P1, P2, \ldots, P8$. Although not shown, the sensors $3_1, 3_2, \ldots, 3_8$ include time measuring means and are adapted to register passage of the beam 4 and to determine the time points $t1, t2, \ldots, t8$ with the aid of said time measuring means. In the case of the FIG. 1 embodiment, the sensors $3_1, 3_2, \ldots, 3_8$ include receivers (not shown) for registering an amplitude of the radar signals. The sensors $3_1, 3_2, \ldots, 3_8$ are also adapted to establish when the electric axis of the beam 4 passes respective sensors $3_1, 3_2, \ldots, 3_8$ with the aid of said time measuring means and the registered amplitude variation of received radar signals, and therewith determine the time points t1,t2, . . . ,t8. The sensors are also adapted to generate a number of sensor signals S1, S2, . . . , S8 that indicate said time points t1,t2, . . . ,t8. The arrangement 1 also includes an analysis unit 5 which is connected to the sensors $3_1, 3_2, \ldots, 3_8$ and adapted to receive the sensor signals S1,S2, . . . , S8.

It will be understood that the invention is not limited to precisely these means for determining the time points t1,t2, . . . ,t8. In an alternative embodiment, it is the analysis unit 5 that includes said time measuring means. In such an alternative embodiment, the arrangement 1 is adapted to transfer beam registering information from the sensors $3_1, 3_2, \ldots 3_8$ to the analysis unit 5, which, in turn, determines the time points t1,t2, . . . ,t8 on the basis of this information and with the aid of the time measuring means.

In the case of the FIG. 1 embodiment, the measuring positions and the sensors are eight in number. It will be understood, however, that the invention is not limited to precisely this number and that the person skilled in this art is free to choose said number from four and upwards, in accordance with prevailing circumstances.

Let $\alpha(i,j)$ denote an angle between the lines of sight to the object 2 from the measuring positions Pi and Pj—$\alpha(1,2)$, $\alpha(1,3)$ and $\alpha(2,3)$ have been indicated in FIG. 1. $\alpha(i,j)$ can be calculated according to:

$$\alpha(i,j) = |\omega \cdot (tj - ti)|, \quad (1)$$

where $\omega$ denotes an angular velocity of the beam 4 and ti and tj denote respectively the time points at which the beam 4 passes the respective measuring positions pi and pj.

Figure 2:
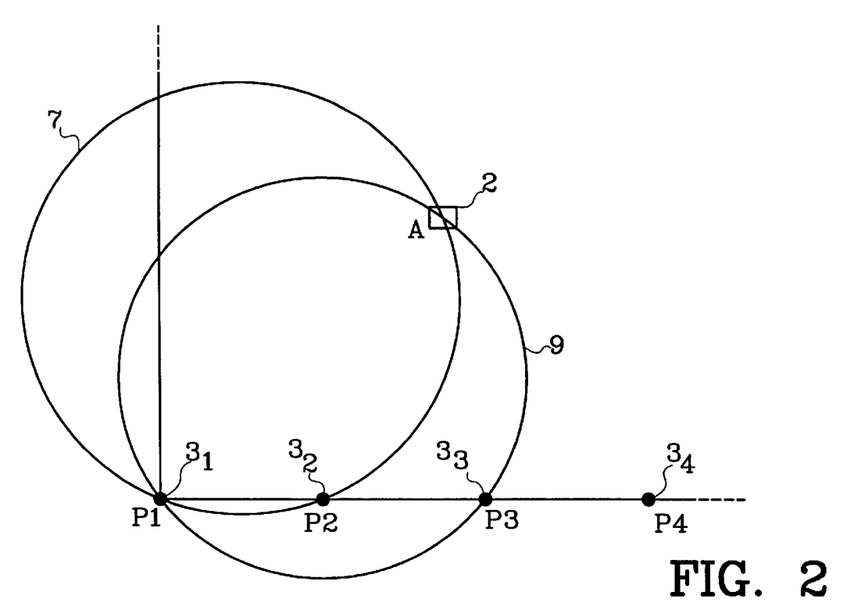
FIG. 2 illustrates by way of example determination of the position of the object when the angular velocity of the beam is known.

FIG. 2 illustrates the determination of the position of the object 2 when the angular velocity $\omega$ of the beam 4 is fully known. Shown in FIG. 2 is a first circle 7 that passes through the measuring positions P1 and P2. The radius of this first circle 7 is equal to $d(P1,P2)/(2 \sin(\alpha(1,2)))$, where $d(P1,P2)$ denotes the distance between the measuring positions. P1 and P2. This means that the angle between the lines of sight from the measuring positions P1 and P2 to each point on the first circle 7 that lies above the chord P1P2 is equal to $\alpha(1,2)$. It will be realised that the part of the first circle 7 that lies above the chord P1P2 gives the possible target positions of the object 2 when the measuring positions P1 and P2 and the angle $\alpha(1,2)$ are known. In FIG. 2, the object 2 lies on a point A which, in accordance with what has been said above, lies on the first circle 7.

The term measuring base as used in the present context is meant to indicate an arbitrary combination of two of the measuring positions P1,P2, . . . ,P8. For instance, the measuring positions P1 and P2 will thus constitute a first measuring base (P1,P2) and the measuring positions P1 and P3 will constitute a second measuring base (P1,P3). When the angle $\alpha(i,j)$ is known, it is possible to construct for each given measuring base (Pi,Pj) a circle which, correspondingly to the first circle 7, gives the possible target positions of the object 2 in relation to the given measuring base (Pi,Pj), and the object 2 must, of course, lie somewhere on such a circle. Thus, when two such circles are constructed for two different measuring bases, the object 2 will be located at a point where these circles mutually intersect.

Also shown in FIG. 2 is a second circle 9 which passes through the measuring positions P1 and P3. The radius of the second circle 9 is equal to $d(P1,P3)/(2 \sin(\alpha(1,3)))$ and thus gives the possible target positions of the object 2 relative to the second measuring base (P1,P3). The first and the second circles 7 and 9 mutually intersect at the measuring position P1 and also at point A. Since the measuring position P1 can be excluded as a target position, the first and the second circles 7 and 9 clearly indicate the position A of the object 2. Therefore, all that is required to determine the point A is knowledge of the measuring positions P1,P2 and P3 and the angles $\alpha(1,2)$ and $\alpha(1,3)$. When the angular velocity $\omega$ beam 4 is fully known, the angles $\alpha(1,2)$ and $\alpha(1,3)$ are obtained through the equation (1) and with knowledge of the time points t1,t2 and t3 at which the beam 4 passes the measuring positions P1,P2 and P3.

For the sake of completeness, it is pointed out that a position corresponding to the mirror image of position A in the x-axis is also a possible position of the object 2 when the aforesaid data is known—at least when the rotational direction of the beam 4 is unknown. However, such a mirror position can be excluded as being unreasonable in many practical applications. Alternatively, the mirror image position can be excluded by virtue of the sensors being angularly sensitive such that signals which arrive from the mirror image position will not be received by the sensors $3_1, 3_2, \ldots 3_8$. A similar case also occurs when a position determination is made on the basis of a pair of measuring bases that do not include any common measuring position, although this complication can also be circumvented in a manner similar to that described above.

Figure 3:
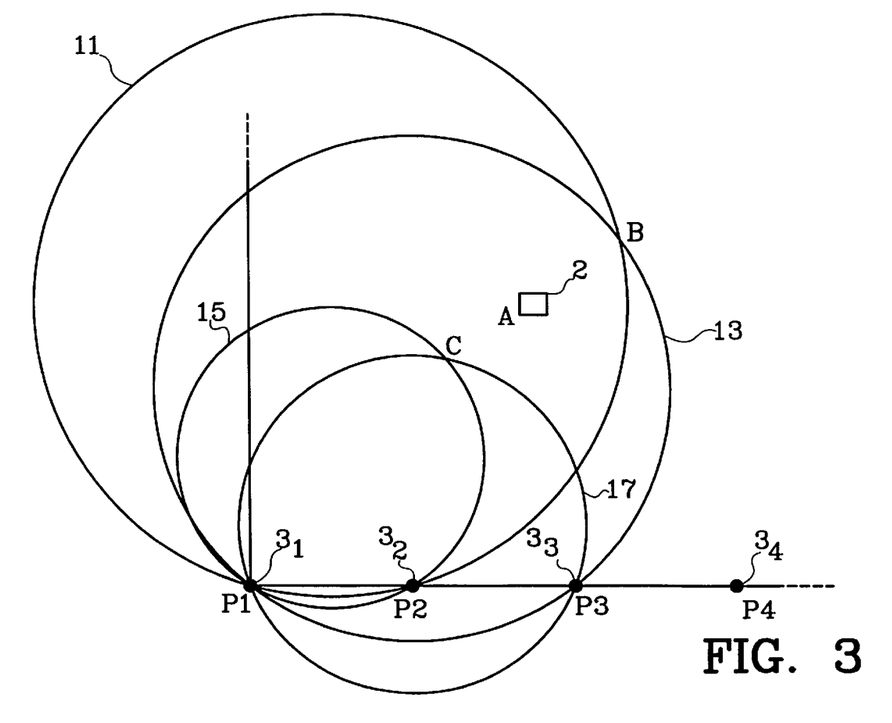
FIG. 3 illustrates how the position determination from FIG. 2 is influenced when the angular velocity is unknown.

FIG. 3 is a view which illustrates how the position determination from FIG. 2 is influenced by the fact that the angular velocity $\omega$ is not fully known. FIG. 3 illustrates how the position determination is influenced by the use in said determination of an assumed angular velocity value that lies beneath the actual value of the angular velocity $\omega$ on the one hand, and how the position determination is influenced by the use in said determination of an assumed angular velocity value that exceeds the actual value of the angular velocity $\omega$ on the other hand.

When the assumed angular velocity value is below the actual value of the angular velocity $\omega$, calculation of the angle $\alpha(1,2)$ and $\alpha(1,3)$ using equation (1) will result in an underestimation of these angles. Shown in FIG. 3 is a third circle 11 and a fourth circle 13 which have been constructed in a manner corresponding to the manner in which the first and the second circle 7 and 9 in FIG. 2 were constructed, although with the difference that the third and the fourth circles 11 and 13 have been constructed on the basis of the underestimated values of the angles $\alpha(1,2)$ and $\alpha(1,3)$. This means, in turn, that the radii of the third and the fourth circles 11 and 13 are overestimated. The third and the fourth circles 11 and 13 will therefore intersect one another at a point B which differs from the true position A of the object 4, thus resulting in an erroneous position determination. The position determination B based on the third and the fourth circles 11 and 13 gives an overestimation of both x- and y-co-ordinates for the object 2.

When the assumed angular velocity value exceeds the actual value of the angular velocity $\omega$, a calculation of the angle $\alpha(1,2)$ and $\alpha(1,3)$ using equation (1) will result in an overestimation of these angles. Also shown in FIG. 3 is a fifth circle 15 and a sixth circle 17, which have been constructed in a manner corresponding to that in which the first and the second circles 7 and 9 in Figure were constructed, although with the difference that the fifth and the sixth circles 15 and 17 have been constructed on the basis of the overestimated values of the angles $\alpha(1,2)$ and $\alpha(1,3)$. This means, in turn, that the radii of the fifth and the sixth circles 15 and 17 are underestimated. The fifth and the sixth circles 15 and 17 will therefore mutually intersect at a point C which differs from the true position A of the object 4, therewith generating an erroneous position determination also in this case. The position determination C based on the fifth and the sixth circles 15 and 17 gives an underestimation of both x- and y-co-ordinates for the position A of the object 2.

Figure 4:
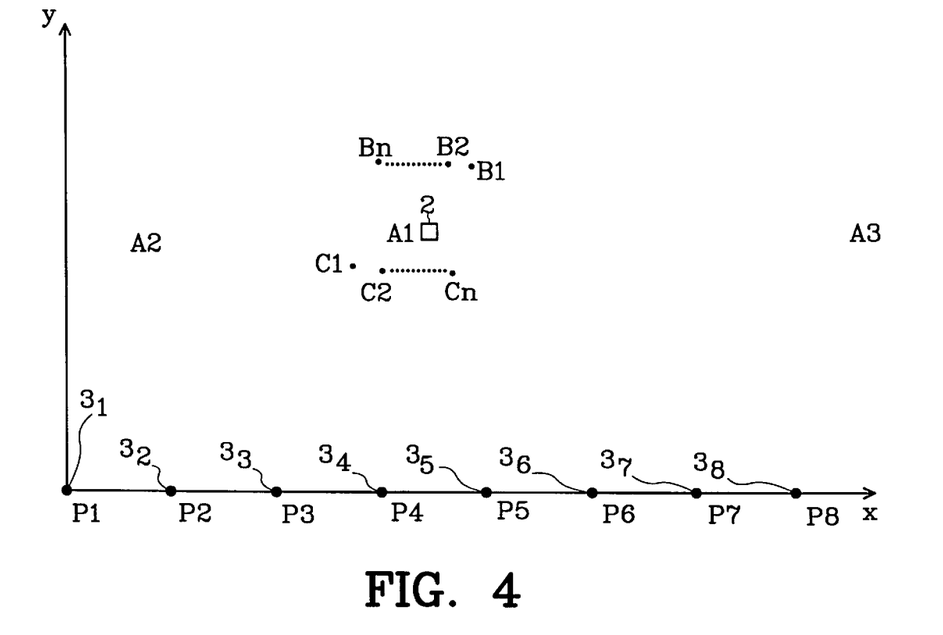
FIG. 4 illustrates how the error of a first and a second sequence of position determinations varies systematically when the angular velocity is unknown.

FIG. 4 illustrates the object 2 at a point A1 that lies generally on a centre point normal to the row of sensors $3_1, 3_2, \ldots, 3_8$. FIG. 4 shows a first sequence of position determinations B1,B2, . . . ,Bn of the object 2. The first sequence of position determinations B1,B2, . . . ,Bn have been generated on the basis of pairs of measuring bases that have been moved successively in the x-direction, and also on the basis of an assumed angular velocity value that was lower than the correct value of the angular velocity $\omega$. Thus, the position determination B1 has been generated on the basis of the measuring base pair (P1,P2) and (P1,P3) and the position determination B2 has been generated on the basis of the measuring base pair (P1,P3) and (P2,P4). The remaining position determinations Bk (k=3, . . . , n) have, of course, been generated in a corresponding manner on the basis of corresponding pairs of measuring bases (Pk,Pk+1) and (Pk, Pk+2). The errors in the position determination B1,B2, . . . ,Bn show a systematic variation when the measuring bases are moved in the x-direction. The y-co-ordinates for the position A1 of the object 2 are overestimated for all position determinations B1,B2, . . . ,Bn in the first sequence. The x-co-ordinates for the position A1 of the object 2 are overestimated for the position determination B1, but underestimated for the position determination Bn. Estimation of the x-co-ordinates for the position A1 of the object 2 thus varies systematically from being an overestimate to being an underestimate when the measuring base pairs are moved successively in the x-direction.

FIG. 4 also shows a second sequence of position determination C1,C2, . . . ,C3 of the object 2. The second sequence of position determinations has been generated on the basis of the same measuring base pairs as the first sequence of position determinations, but with an assumed angular velocity value that exceeds the actual value of the angular velocity $\omega$. The y-co-ordinates for the position of object 2 are underestimated for all position determinations C1,C2, . . . ,C3 in the second sequence, whereas the x-co-ordinates for the position A1 of the object 2 vary from being underestimated to being overestimated when the measuring base pairs are moved successively in the x-direction.

If a correct assumed value of the angular velocity $\omega$ has been used in the position determinations made in FIG. 4, all position determinations would, of course, have resulted in the correct position A1.

Let X(Pi) denote an x-coordinate for the measuring position Pi and let XO(j) denote a mean value of x-co-ordinates X(Pj) and X(Pj+2) for the measuring positions in the second measuring base (Pj,Pj+2) which was used in the position determination Bj (or Cj). XO(j) is thus obtained according to: XO(j)=(X(Pj)+X(Pj+2))/2. XO(j) and indicates the position along the x-axis of the measuring base pairs (Pj,Pj+1) and (Pj,Pj+2) on the basis of which the position determination Bj (or Cj) is made. Also let X(Bk) and X(Ck) denote x-co-ordinates for the position determinations Bk and Ck respectively.

As before mentioned, XO(j) indicates the position along the x-axis of the measuring base pair (Pj,Pj+1) and (Pj,Pj+2). Alternatively, it is, of course, possible to indicate this position in some other way, for instance by suitably weighing together x-co-ordinates X(Pj), X(pj+1) and X(pj+2) for all measuring positions included in the measuring base pair (Pj,Pj+1) and (Pj,Pj+2).

Figure 5:
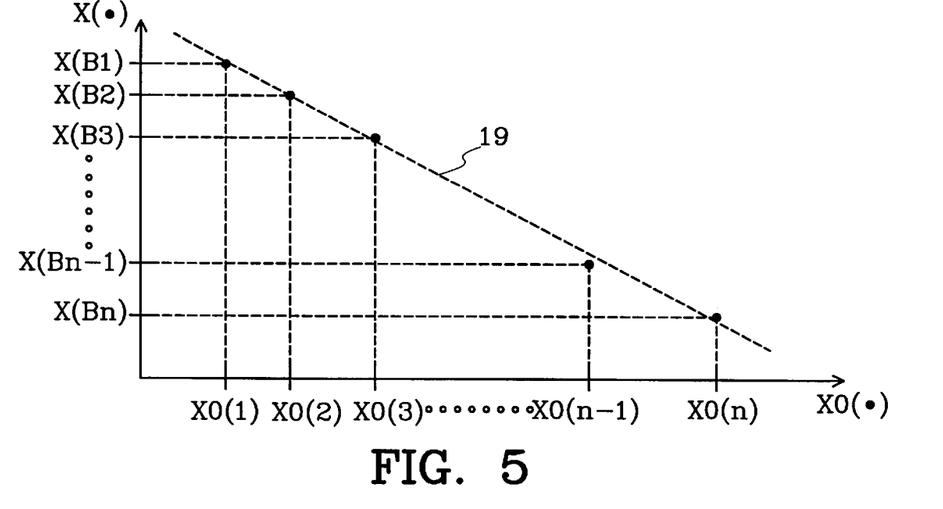
FIG. 5 is a diagram which illustrates how x-co-ordinates for the first sequence of position determinations vary systematically.

FIG. 5 is a diagram which describes schematically, with a number of dot markings, the x-co-ordinates X(B1),X(B2), . . . ,X(Bn) for the first sequence of position determinations B1,B2, . . . ,Bn as a function of the corresponding mean value x-co-ordinates XO(1),XO(2), . . . ,XO(n). The x-co-ordinates X(B1),X(B2), . . . ,X(Bn) for the first sequence of position determinations B1,B2, . . . ,Bn decreases almost rectilinearly as a function of the mean value x-co-ordinates XO(1),XO(2), . . . ,XO(n). A first straight line 19 is adapted to the drawn points in FIG. 3 and has a negative gradient coefficient in accordance with the aforegoing.

Figure 6:
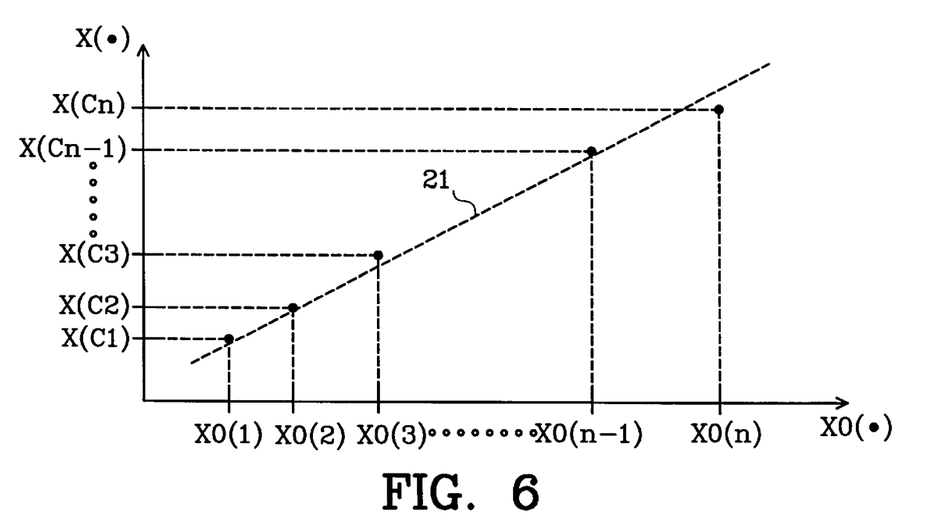
FIG. 6 is a diagram which illustrates how x-co-ordinates for the second sequence of position determinations vary systematically.

FIG. 6 is a schematic, diagrammatic illustration which describes with the aid of a number of dot markings the x-co-ordinates X(C1),X(C2), . . . ,X(Cn) for the second sequence of position determinations C1,C2, . . . ,Cn as a function of the corresponding mean value x-co-ordinates XO(1),XO(2), . . . ,XO(n). The x-co-ordinates X(C1),X(C2), . . . ,X(Cn) for the second sequence of position determinations C1,C2, . . . ,Cn increase almost rectilinearly as a function of the mean value x-co-ordinates XO(1),XO(2), . . . ,XO(n). A second straight line 21 is adapted to the drawn points in FIG. 3 and has a positive gradient coefficient in accordance with the aforegoing.

It will be seen from FIGS. 5 and 6 that it is possible to determine whether a given assumed angular velocity value is greater or smaller than the correct value of the angular velocity $\omega$, by generating a sequence of position determinations on the basis of measuring base pairs that have mutually varying positions along the x-axis. If the x-co-ordinates X(B1),X(B2) . . . ,X(Bn) for the position determinations decrease in dependence on the mutual positions of the measuring base pairs along the x-axis—these mutual positions having been indicated above with the aid of the mean value x-co-ordinates XO(1),XO(2), . . . ,XO(n)—the angular velocity is underestimated. In the opposite case—in which the x-co-ordinates X(C1),X(C2), . . . ,X(Cn) increase in dependence on the mean value x-co-ordinates XO(1),XO (2), . . . ,XO(n)—the angular velocity $\omega$ is instead overestimated.

FIG. 4 shows the object 2 located in a position A1 that lies essentially on the centre point normal of the row of sensors $3_1, 3_2, \ldots 3_8$. That which has been said in the aforegoing as to how it can be established whether the angular velocity $\omega$ is overestimated or underestimated by considering whether the x-co-ordinates for the position determinations increase or decrease in dependence on the mutual positions of the measuring base pairs is, however, applicable even when the object 2 is located asymmetrically in relation to the row of sensors $3_1, 3_2, \ldots, 3_8$, for instance at the points A2 or A3 in FIG. 4.

Figure 7:
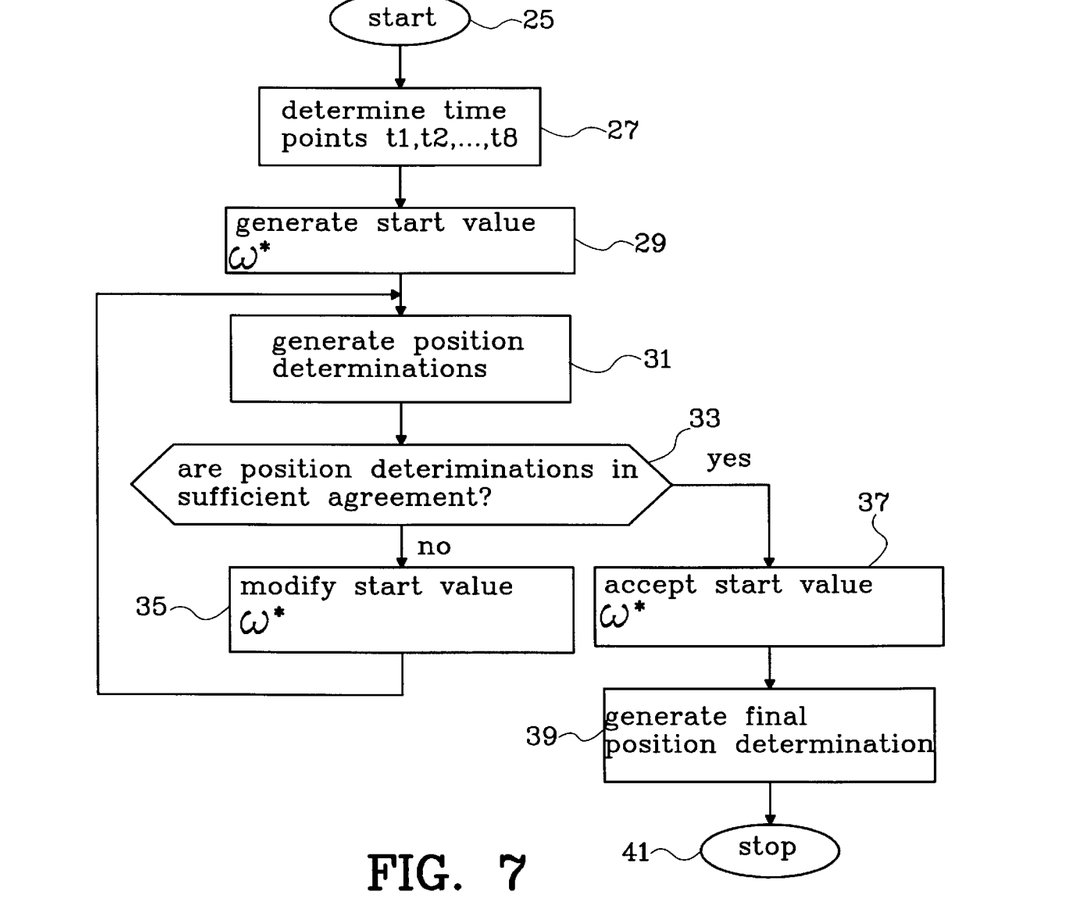
FIG. 7 illustrates an example of a flowchart describing a procedure according to which the arrangement is designed to operate in monitoring the object when the angular velocity is unknown.

FIG. 7 illustrates by way of example in accordance with the invention a flowchart that describes a method in which the arrangement 1 is designed to operate when monitoring the object 2 with the angle of velocity $\omega$ of the beam 4 unknown.

The procedure illustrated in FIG. 7 is initiated with a start 25 followed by a first step 27 in which the time points t1,t2, . . . ,t8 at which the beam 4 passes the measuring positions P1,P2, . . . ,P8 are determined. This is effected with the aid of the time measuring means. The sensors $3_1, 3_2, \ldots, 3_8$ generate the sensor signals S1,S2, . . . ,S8 that indicate the time points t1,t2, . . . ,t8. The sensor signals S1,S2, . . . ,S8 are transferred to the analysis unit 5.

The procedure illustrated in FIG. 7 continues with a second step 29, in which a start value $\omega^*$ for the angular velocity ω is generated. In the procedure illustrated in FIG. 7, the start value ω* is a stored value that is taken from a memory device (not shown) included in the analysis unit 5.

The procedure shown in FIG. 7 continues with a third step 31 in which there is generated a predetermined number (n) of position determinations D1,D2, . . . ,Dn of the object 2. In this regard, the position determinations are generated in dependence on the measuring positions P1,P2, . . . ,P8, the time points t1,t2, . . . ,t8 and the start value ω* on the basis of pairs of measuring bases whose positions vary along the x-axis. In the case of the procedure exemplified in FIG. 7 the measuring base pairs used correspond to those used in the position determinations (Bk and Ck) in FIG. 4, in other words (Pk,Pk+1) and (Pk,Pk+2) (k=1,2, . . . ,n). The invention is not limited to this choice of measuring base pairs, however, and the person skilled in this art has the possibility of choosing measuring base pairs that have varying positions along the x-axis in some other way, depending on prevailing circumstances.

At least three measuring positions are required to carry out one of the position determinations. A necessary condition is that at least two of the position determinations are independent (i.e. position determinations that are not necessarily in agreement regardless of which start value ω* is chosen). At least four measuring positions are required to generate two mutually independent position determinations. The invention is therefore not restricted to just eight measuring positions, but can be applied from four measuring positions and upwards.

The procedure illustrated in FIG. 7 continues with a fourth step 33 in which it is decided, in accordance with a predetermined criterion, whether or not the generated position determinations D1,D2, . . . ,Dn are sufficiently in agreement. This is achieved by observing how the x-co-ordinates X(D1),X(D2), . . . ,X(Dn) of the generated position determinations vary as a function of the corresponding mean value x-co-ordinates XO(1),XO(2), . . . ,XO(n). There is generated to this end a gradient value LUT according to:

$$LUT = \frac{2}{n} \sum_{m=1}^{int(n/2)} \frac{X(Dn/2+m) - X(Dm)}{XO(n/2+m) - XO(m)} \quad (2)$$

where int (n/2) denotes the integral part of n/2. A positive gradient value LUT indicates that the x-co-ordinates X(D1), X(D2), . . . ,X(Dn) increases as a function of the mean value x-co-ordinates XO (1),XO(2), . . . ,XO (n), while a negative gradient value LUT indicates, of course, that said x-co-ordinates decrease instead, in a corresponding manner. It is determined in the fourth step 33 that the generated position determinations are in sufficient agreement if the absolute value of the gradient value LUT is smaller than a predetermined value.

The invention is not restricted to this way of determining whether or not the generated position determinations D1, D2, . . . ,Dn are sufficiently in agreement. An alternative in this regard is to generate a value which corresponds to a standard deviation of the x-co-ordinates X(D1),X(D2), . . . ,X(Dn) for the generated position determinations. If the standard deviation is smaller than a predetermined first value, the position determinations D1,D2, . . . ,Dn are considered to be sufficiently in agreement in this case. Another alternative is to generate a value corresponding to an inertial radius r for the generated position determinations D1,D2, . . . ,Dn in accordance with:

$$r = \frac{1}{n}\sqrt{\sum_{m=1}^{n} d(Dm, \overline{D})^2}$$

where $\overline{D}$ indicates the mean value of the generated position determinations D1,D2, . . . ,Dn. If the inertial radius r is smaller than a predetermined second value, the position determinations D1,D2, . . . ,Dn are considered to be in sufficient agreement.

If it is decided in the fourth step 33 of FIG. 7 that the generated position determinations are not in sufficient agreement, the procedure continues with a fifth step 35. In the fifth step 35, the start value ω* is modified in order to correspond to a greater extent to the correct value of the angular velocity ω. In the procedure illustrated in FIG. 7, the start value ω* is modified with the aid of the gradient value LUT in accordance with $$\omega^*(modified) = \omega^* \cdot (1 - \kappa \cdot LUT), \quad (3)$$

where κ is a positive parameter. The parameter κ determines the speed at which the procedure described in FIG. 7 converges. The value of the parameter κ that provides optimum convergence will depend generally on how the invention is applied. The value of κ is normally not critical and an appropriate value can be obtained through practical tests and/or from experience. A κ value that ranges from 0.4–0.5, however, has been found to function well. As explained in the aforegoing, the gradient value LUT indicates whether the start value ω* exceeds or lies beneath the correct value of the angular velocity ω of the beam 4. The start value ω* is thus reduced when it lies above the correct value of the angular velocity ω and is, of course, increased when the opposite is true.

It will be understood that the invention is not restricted to this method of modifying the start value ω* and that the person skilled in this art can choose other strategies to this end, in accordance with prevailing circumstances and his/her own liking.

Upon completion of the fifth step 35 in FIG. 7, the procedure is restarted from the third step 31. The procedure in FIG. 7 is then followed in the aforedescribed manner and the start value ω* is modified successively to correspond to the correct value of the angular velocity ω to an ever higher degree. This continues until it is determined in the fourth step 33 that the generated position determinations D1,D2, . . . ,Dn are in sufficient agreement.

When it is determined in the fourth step 33 in FIG. 7 that the generated position determinations D1,D2, . . . ,Dn are in sufficient agreement, the procedure continues with a sixth step 37. The sixth step 37 implies that the start value ω* is accepted as an approximate value which approximates the correct value of the angular velocity ω to an acceptable degree of accuracy. The procedure has thus established the angular velocity ω. In the procedure described in FIG. 7, the start value is shown to be accepted as the approximate value by storing said value in a memory device (not shown) in the analysis unit 5.If the procedure in FIG. 7 is utilised several times, the stored approximate value can later be used in generating the start value ω*.

Since the position determinations D1, D2, . . . ,Dn are sufficiently in agreement, it is naturally implicit that the start value ω* is the approximate value of the angular velocity ω. It is therefore usually unnecessary to expressly accept the start value ω* as the approximate value of the angular velocity ω as in the sixth step 37 in FIG. 7, and consequently the person skilled in this art may consider it appropriate to exclude the sixth step 37.

The sixth step 37 in FIG. 7 is followed by a seventh step 39 in which the position of the object 2 is finally determined. This final position determination is achieved by forming a mean value from the position determinations D1,D2, . . . ,Dn last generated in the third step 31.

The invention is not restricted to making the final position determination in this way, and the person skilled in this art may use any other appropriate method to this end, in accordance with prevailing circumstances and to his/her own liking. For instance, the final position determination may be made by forming a median value from the position determinations D1,D2, . . . ,Dn generated last in the third step 31, therewith reducing the influence of extreme deviations of one or more of the position determinations. The procedure is terminated upon completion of the seventh step 39, as indicated by a stop 41. The seventh step 39 may be excluded, of course, when the position of the object 2 is of no interest.

The analysis unit 5 includes means for carrying out the procedure set forth in FIG. 7 and alternative procedures according to the invention. For instance, the analysis unit 5 may include to this end a computer and associated software or circuitry that includes hardware components—or a combination of these devices. The invention thus also includes devices for carrying out the procedure in FIG. 7 and alternative procedures according to the invention.

In the illustrated examples, the y-co-ordinates of the measuring positions P1,P2, . . . ,P8 are substantially zero. It will be understood, however, that the invention is not restricted hereto and that it will also function when the y-co-ordinates of the measuring positions P1,P2, . . . ,P8 are distanced from zero to a greater or lesser extent.

What is claimed is:

1. A method of monitoring an object that emits a beam which rotates at an unknown angular velocity, comprising the steps of:
   a) determining time points at which the beam passes at least four predetermined measuring positions;
   b) generating an angular velocity start value;
   c) generating at least two independent object position determinations on the basis of said measuring positions, said time points and said start value;
   d) determining in accordance with a predetermined criterion whether or not the independent position determinations are sufficiently in agreement with one another;
   e) modifying the start value when it is found in step d) that the position determinations are not in sufficient agreement; and
   f) repeating steps c) up to and including e) until it is found in step d) that the position determinations are sufficiently in agreement.

2. A method according to claim 1, further comprising the following step:
   g) accepting the start value as an approximate value of the angular velocity of the beam when it is found in step d) that the position determinations are sufficiently in agreement.

3. A method according to claim 1, further comprising the step of:
   h) generating a final position determination of the object when it has been found according to step d) that the position determinations are sufficiently in agreement.

4. A method according to claim 3, wherein the final position determination is generated on the basis of the position determinations last generated in step c).

5. A method according to claim 1, wherein step a) includes:
   i) registering the beam by means of sensors disposed at the measuring positions; and
   j) determining when respective sensors register said beam and thereby obtain said time points.

6. A method according to claim 1, wherein step c) includes generating the position determinations on the basis of measuring base pairs that have varying positions along a pre-determined axis.

7. A method according to claim 6, wherein step e) includes:
   k) generating a set of values corresponding to the positions of the measuring base pairs along said axis;
   l) determining on the basis of the coordinates of said position determinations along said axis and the set of values whether the start value lies above or below the angular velocity;
   m) reducing the start value when step l) shows that the start value lies above said angular velocity; and
   n) increasing said start value when it is found in step l) that the start value lies above said angular velocity.

8. A method according to claim 7, wherein step l) includes the following steps:
   o) determining whether the coordinates of the position determinations along said axis decrease or increase as a function of the corresponding values in the set of values generated in step k); and
   p) determine whether the start value lies above or beneath the angular velocity on the basis of the findings in step o).

9. An arrangement for monitoring an object that emits a beam which rotates at an unknown angular velocity, comprising:
   means for determining the times at which the beam passes at least four pre-determined measuring positions; and
   an analysis unit, wherein the analysis unit is adapted to
      a) generate a start value for the unknown angular velocity;
      b) generate at least two independent position determinations of the object on the basis of said measuring positions, said time points and said start value;
      c) determine whether or not the position determinations are sufficiently in agreement, in accordance with a predetermined criterion;
      d) modify the start value when the analysis unit has found according to c) that the position determinations are not sufficiently in agreement; and
      f) repeat steps b) up to and including d) until the analysis unit has found according to c) that the position determinations are sufficiently in agreement.

10. An arrangement according to claim 9 wherein the analysis unit is adapted to g) accept the start value as an approximate value of the angular velocity when the analysis unit has found according to c) that the position determinations are sufficiently in agreement.

11. An arrangement according to claim 9, wherein the analysis unit is adapted to h) generate a final object position determination when the analysis unit has found according to c) that the position determinations are sufficiently in agreement.

12. An arrangement according to claim 9, wherein:
   the time point determining devices include beam registering sensors disposed at said measuring positions; and the time point determining devices also include time measuring means for determining the times at which respective sensors register the passage of said beam.

13. An arrangement according to claim 12, wherein the time measuring means are including in the analysis.

14. An arrangement according to claim 12, wherein the time measuring means are disposed by the sensors.

15. An arrangement according to claim 9 wherein the analysis unit is adapted to generate according to b) the position determinations on the basis of measuring base pairs that have varying positions in relation to a predetermined axis.

16. An arrangement according to claim 15, wherein the analysis unit is adapted to modify the start value according to e) by virtue of the analysis unit being adapted to generate i) a set of values corresponding to the positions of the measuring base pairs along said axis and to j) determine whether the start value lies above or beneath the angular velocity, on the basis of the coordinates of the position determinations along said axis and said set of values;

the analysis unit is adapted to k) reduce the start value when the analysis unit finds that the start value lies above the angular velocity, according to j); and the analysis unit is adapted to l) increase the start value when the analysis unit has found that the start value lies below the angular velocity, according to j).

17. An arrangement according to claim 16, wherein the analysis unit is adapted to determine according to j) whether the start value lies above or beneath the angular velocity, by virtue of the analysis unit being adapted to determine at m) whether the coordinates of the position determinations along said axis increase or decrease as a function of the corresponding values in the set of values generated by the analysis unit according to i) and also by virtue of being adapted to determine at n) whether the start value lies above or below the angular velocity, on the basis of the finding according to m).

* * * * *